United States Patent
Birrell

[19]
[11] Patent Number: 5,990,628
[45] Date of Patent: *Nov. 23, 1999

[54] LIGHT LEVEL SENSOR FOR DETECTING THE LEVEL OF INCIDENT LIGHT AND DISCRIMINATING BETWEEN NATURAL AND ARTIFICIAL LIGHT

[75] Inventor: Peter Birrell, Darlinghurst, Australia

[73] Assignee: H.P.M. Industries Pty Limited, New South Wales, Australia

[*] Notice: This patent issued on a continued prosecution application filed under 37 CFR 1.53(d), and is subject to the twenty year patent term provisions of 35 U.S.C. 154(a)(2).

[21] Appl. No.: 08/728,199

[22] Filed: Oct. 10, 1996

[51] Int. Cl.$^6$ ..................................................... H05B 37/02
[52] U.S. Cl. ........................... 315/151; 315/158; 315/154; 315/157; 315/153; 250/206; 250/214 R; 250/214 AL; 250/214 B; 250/214 C
[58] Field of Search ................................ 250/206, 214 R, 250/221, 214 AL, 214 B, 214 C; 315/153, 154, 156, 157, 149, 151, 158, 308; 307/116, 117

[56] References Cited

U.S. PATENT DOCUMENTS

| | | | |
|---|---|---|---|
| 3,443,101 | 5/1969 | Bockemuehl | 250/206 |
| 4,347,461 | 8/1982 | Carlson | 315/158 |
| 4,587,459 | 5/1986 | Blake | 315/158 |
| 4,827,119 | 5/1989 | Gaboury | 250/214 R |
| 4,879,461 | 11/1989 | Philipp . | |
| 5,235,252 | 8/1993 | Blake | 315/151 |

FOREIGN PATENT DOCUMENTS

| | | | |
|---|---|---|---|
| 0295933 | 12/1988 | European Pat. Off. | G01J 1/16 |
| 2577742 | 8/1986 | France | H05B 37/02 |
| 57-132028 | 8/1982 | Japan | G01J 1/42 |
| 2060163 | 4/1981 | United Kingdom | G01J 1/44 |

*Primary Examiner*—Arnold Kinkead
*Attorney, Agent, or Firm*—Ladas & Parry

[57] ABSTRACT

A light level sensor for use in controlling the switching of artificial lighting. The sensor comprises a photoelectric transducer which provides an output signal at a level which is significant of the illumination level of incident light. An A-D converter and a microprocessor are located in circuit with the transducer for detecting the level of the transducer output signal and for any cyclic variation of the transducer output signal resulting from cyclic variation of the level of incident light. Further circuit means are provided for generating a sensor output signal if either (a) the level of the transducer output signal is below a predetermined level or (b) the level of the output signal is above the predetermined level and, at the same time, cyclic variations occur in the level of the transducer output signal. When the sensor is used to switch artificial lighting on, with falling ambient light, the sensor output signal is used to energise a lighting control relay when the ambient light falls below the predetermined level. The relay thereafter is held ON if the sensor detects the presence of a high light level, provided that the high light level is attributable only to the artificial lighting as recognised by detection of cyclic variation of the transducer output signal.

8 Claims, 2 Drawing Sheets

LIGHT LEVEL SENSOR FOR DETECTING THE LEVEL OF INCIDENT LIGHT AND DISCRIMINATING BETWEEN NATURAL AND ARTIFICIAL LIGHT

FIELD OF THE INVENTION

This invention relates to a light level sensor for use in detecting the level of ambient light and for controlling the switching of electrical circuits when the ambient light level falls below or rises above a predetermined level. The invention has particular application to a sensor which may be used for switching lighting with rise and fall of ambient light conditions and the invention is hereinafter described in the context of such an application. However, it will be understood that the invention does have broader application, to the use of a light level sensor for various control functions.

BACKGROUND OF THE INVENTION

Conventional light level sensors normally incorporate photoelectric transducers which have an inherently slow response time, typically significantly greater than 20 milliseconds. The transducers produce a dc output signal, the level of which varies with the illumination level of incident radiation. Also, the response time of the complete sensors is normally damped to allow for transitory events, such as temporary cloud cover, and the total effective response time of the sensors may be fixed as high as 30 seconds.

Consequently, conventional types of light level sensors cannot distinguish between natural (ambient) light and artificial light that normally is modulated at a rate equal to the supply frequency or, in the case of lighting sources such as compact fluorescent lamps that have their own power supply, at a rate in the range 20 to 50 kHz. This means that the sensors must be shielded from the artificial light, a factor that sometimes escapes the attention of electricians and others who are responsible for siting the sensors, in order to prevent "confusion" arising from the existence of artificial light and to prevent the establishment of a slow ON-OFF switching cycle.

At least one attempt has been made to solve this problem by providing a sensor housing that incorporates a movable shield to hide the sensor from an adjacent artificial light source, but the present invention is directed to a more general solution of the problem by providing a sensor that detects for the presence of modulated light and uses this to distinguish between high light levels produced on the one hand by natural light and on the other hand by artificial light.

SUMMARY OF THE INVENTION

The present invention may be defined broadly as a light level sensor that comprises a photoelectric transducer which provides a transducer output signal at a level which is significant of the illumination level of incident light. Means are located in circuit with the transducer for detecting the level of the transducer output signal and for any cyclic variation of the transducer output signal resulting from cyclic variation of the level of incident light, and further circuit means are provided for generating a sensor output signal if (a) the level of the transducer output signal (representative of the illumination level) is below a predetermined level or (b) the level of the transducer output signal is above the predetermined level and, at the same time, cyclic variations occur in the level of the transducer output signal.

The sensor output signal may comprise a HIGH signal or a LOW signal depending upon the intended application of the sensor. When the sensor is used to switch artificial lighting on, with falling ambient light, the sensor output signal may be used to energise a lighting control relay when the ambient light falls below a predetermined level. The relay will thereafter be held ON even if the sensor detects the presence of a high light level, provided that the high light level is attributable only to the artificial lighting. The presence of such lighting will be recognised by detection of cyclic variation of the transducer output signal.

When conditions are such that the ambient light makes a transition from a low level to a high level and the artificial light remains momentarily on, conflicting conditions apparently will exist. That is, whereas the sensor should function to de-energise the relay (due to the existence of high ambient light) the sensor will continue to "see" the cyclically varying light and attribute the high light level to the artificial light source. However, the level of the varying component of the incident light will inherently be insignificantly small relative to the total incident light level under this condition (i.e., the natural, ambient light will swamp the artificial light) and the consequential ripple will be of no significance due to normal saturation of the transducer or will be rendered insignificant by subsequent signal processing.

PREFERRED FEATURES OF THE INVENTION

Cyclic variation of the transducer output signal may be detected by processing the signal in a manner to determine changes in phase of the signal. Alternatively and preferably, the signal may be processed in a manner to analyse it incrementally for variations in amplitude.

Having derived a signal which is significant of the level of incident light and/or significant of the existence of modulated light, further signal processing may be effected in the apparatus of the present invention to determine the existence of a stable condition before applying the sensor output signal to a control function. Thus, a response delay may effectively be introduced to accommodate transitory conditions such as temporary cloud cover or brief light flashes.

The invention will be more fully understood from the following description of a preferred embodiment of a light level sensor for use in controlled switching of ambient lighting under low light conditions. The description is provided with reference to the accompanying drawings.

DETAILED DESCRIPTION OF THE INVENTION

Figure 1:
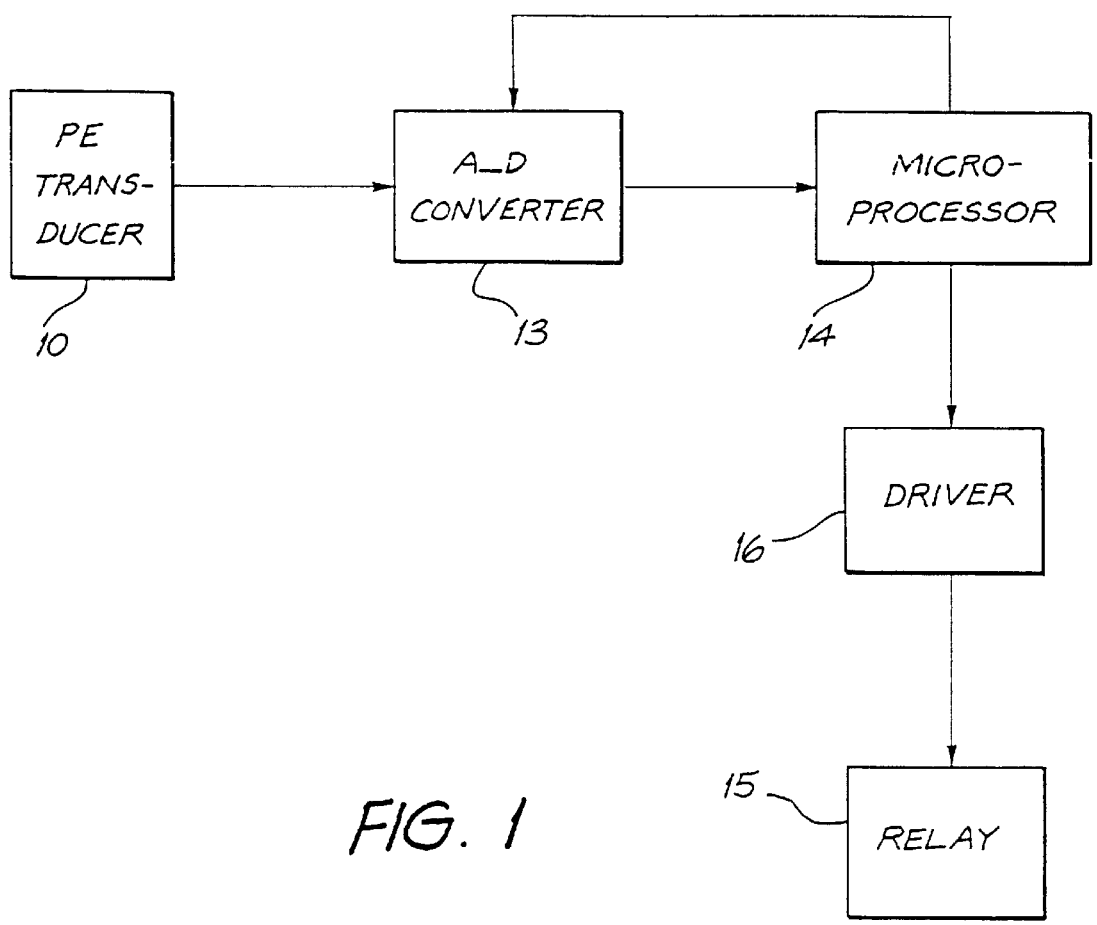
FIG. 1 shows a block diagrammatic representation of the sensor and a relay which is controlled (energised or de-energised) by the sensor.
Figure 2:
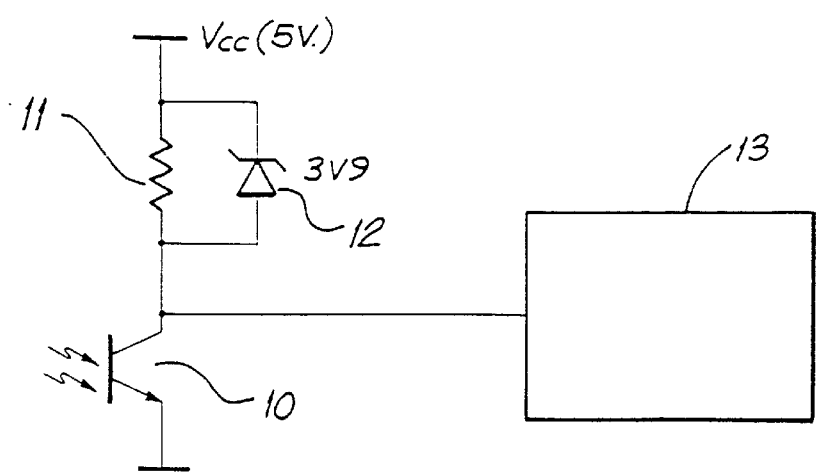
FIG. 2 shows a simplified circuit of a photoelectric transducer element in the form of a phototransistor.

As illustrated, the light level sensor comprises a photoelectric transducer 10 in the form of a phototransistor. A zener diode 12 is connected across a collector load resistor 11 of the transistor for the purpose of introducing non-linearity under high incident light conditions. The output from the transducer 10 will appear as a dc signal in the event of incident natural (solar) radiation, as a full-wave rectified ac signal (herein referred to as an "ac signal") in the event of incident ("modulated") light from an artificial light source such as an incandescent lamp or a fluorescent lamp, and as a dc-shifted ac signal in the event of composite incident radiation.

Thus, the level (or average level) of the output signal from the transducer 10 will be significant of the level of incident light, whatever may be the source of the light, and the frequency of variation (if any) of the signal will be proportional to the modulation frequency of light from an artificial source. By detecting cyclic variation of the transducer output signal a determination may be made as to whether the incident light originates from an artificial source or is in the form of natural, ambient light.

The transducer output signal is applied to an analogue-to-digital converter 13 which functions to sample and digitise the transducer output signal under the control of a microprocessor 14. Sampling is conveniently effected at a rate of 25 samples per 10 millisecond period and at 256 incremental levels.

The output from the A-D converter 13 is fed to the microprocessor 14 and each successive byte is compared with each immediately preceding byte to determine relative quantised measures of the transducer output signal samples. For this purpose, the value attributed to the first sample in a sequence is allocated to both the stored "highest value" and "lowest value" samples. Then, if a given byte is representative of a sampled amplitude which is higher in value than that of a preceding sample, the stored highest value is incremented by one. Similarly, if a given byte is representative of a sampled amplitude which is lower in value than that of the preceding sample, the stored lowest value is decremented by one. Then, following 25 samples, the stored lowest byte value is subtracted from the stored highest byte value to provide a so-called light variation number, and this number is compared with a stored constant for the purpose of determining arbitrarily whether there is a significant variation of the amplitude and, over successive periods, if the amplitude is varying periodically. The actual value of periodic variation (i.e., frequency) is not required to be determined, although it may be determined for the purpose of enhancing detection of low frequency light modulation. That is, the periodic variation value may be detected for the purpose of enhancing detection of low frequency levels attributable to mains energised filament lamps. Detection enhancement is achieved by detecting the frequency of amplitude peaks and testing it against the actual mains frequency.

Also, during each sampling period a determination is made as to the average value of the difference between the quantised high and low levels of the transducer output signal. This provides a periodic measure of the level of light falling incident on the transducer and is compared with a reference value for the purpose of producing a HIGH light indication or a LOW light indication. A LOW light indication is used to generate a signal which is applied to a relay 15, by way of a driver stage 16, to effect energising of the relay and consequential switching of ambient lighting 17.

Figure 3:
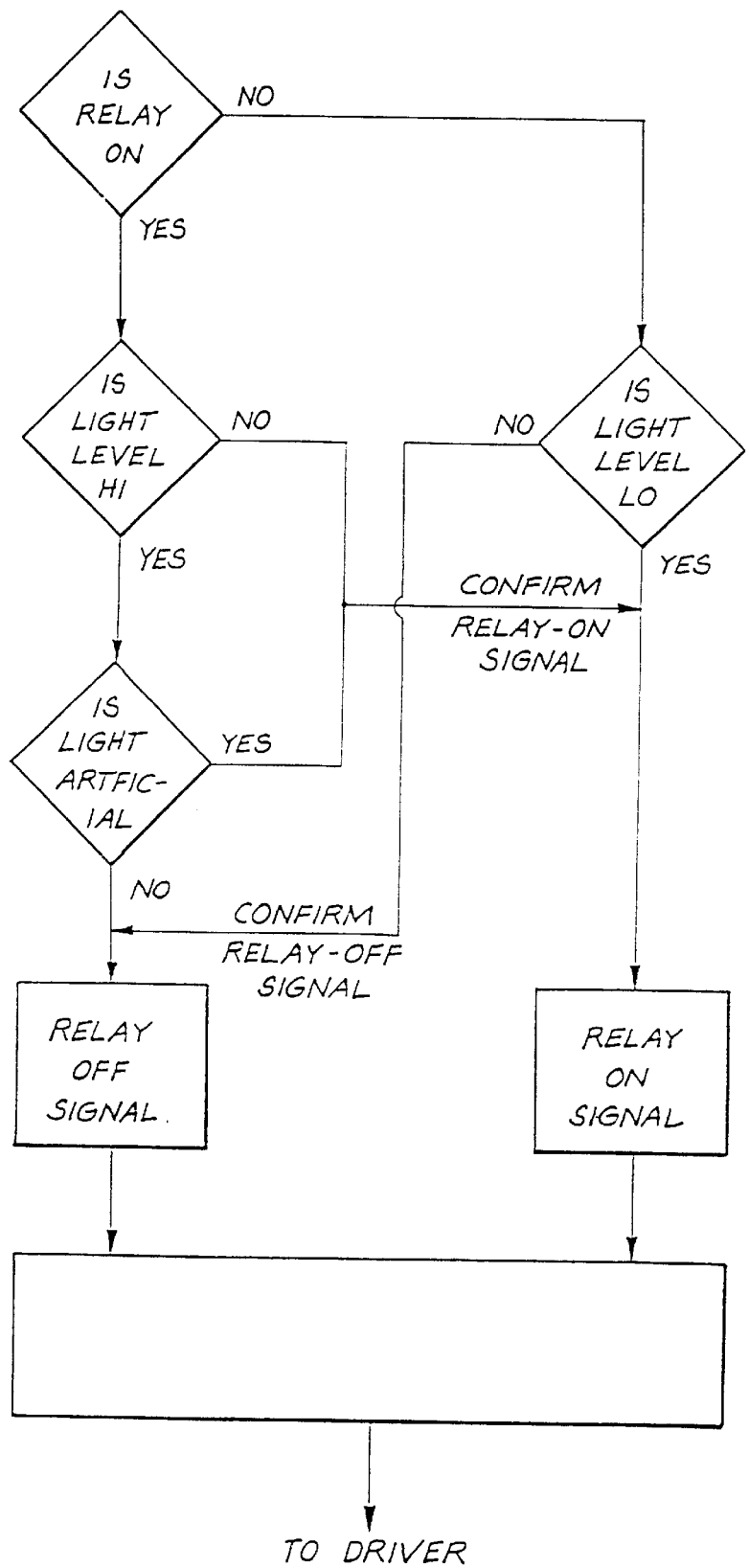
FIG. 3 shows a flow diagram of process control functions performed in the sensor.

All of the above described operations are program controlled in the microprocessor 14, and the various process control functions, plus a supplementary function, are indicated diagrammatically in the flow diagram shown in FIG. 3.

As indicated in FIG. 3 of the drawings, if the incident light level is low and the relay is not energised, a relay ON signal is generated.

If the incident light subsequently goes high, a test is made whether the light is modulated and, hence, originates from an artificial source. If it is determined that the light originates from an artificial source, the relay ON signal is confirmed. On the other hand, if it is determined that the high level light does not originate from the artificial source, it is assumed that the high light level is attributable to increasing ambient light and a relay OFF signal is generated.

The relay ON and OFF signals are both stored over a 30 second period and if the total number of ON signals is greater than the total number of OFF signals by a factor of 2:1, the relay is energised or, if already energised, is maintained in an energised condition. Conversely, if the total number of OFF signals is greater than the total number of ON signals by a factor of 2:1, the relay is de-energised. Thus, by storing the relay ON and relay OFF signals for a 30-second period, allowance may be made for transitory changes in ambient light conditions.

I claim:

1. A light level sensor comprising a photoelectric transducer which provides a transducer output signal at a level which is significant of the illumination level of incident light and at a cyclically varying level when incident light is derived at least in part from a mains powered artificial light source, means located in circuit with the transducer for detecting the level of the transducer output signal and for detecting the presence of any cyclic variation in the level of the transducer output signal resulting from cyclic variation in the level of incident artificial light, and means for generating a sensor output signal for use in controlling energization of the artificial light source if either of the following conditions is detected to exist:—(a) the level of the transducer output signal is below a predetermined level or (b) the level of the transducer output signal is above the predetermined level and, at the same time, cyclic variations are detected to occur in the level of the transducer output signal.

2. The light level sensor as claimed in claim 1 wherein the means for detecting for cyclic variation of the level of the transducer output signal comprises means for processing the transducer output signal in a manner to analyse the transducer output signal incrementally for variations in amplitude.

3. The light level sensor as claimed in claim 1 wherein the photoelectric transducer comprises a solid state photodetector device and means connected in circuit with the device for introducing non-linearity under high incident light conditions.

4. A light level sensor comprising a photoelectric transducer which provides a transducer output signal at a level which is significant of the illumination level of incident light and at a cyclically varying level when the incident light is derived at least in part from a mains powered artificial light source, means located in circuit with the transducer for detecting the level of the transducer output signal and for detecting the presence of any cyclic variation in the level of incident artificial light, and means for generating a sensor output signal for use in controlling energization of the artificial light source if either of the following conditions is detected to exists:—(a) the level of the transducer output signal is below a predetermined level or (b) the level of the transducer output signal is above the predetermined level and, at the same time, cyclic variations are detected to occur in the level of the transducer output signal, the photoelectric transducer being arranged to generate the transducer output signal as a dc signal in the event that the incident light comprises solar radiation, as an ac signal in the event that the incident light comprises light from the mains powered artificial light source and as a dc-shifted ac signal in the event that the incident light is composed of both solar radiation and light from the mains powered artificial light source.

5. The light level sensor as claimed in claim 4 wherein the means for detecting the level of the transducer output signal comprises an A-D converter which functions to sample and digitise the transducer output signal under the control of a microprocessor and further comprises processing circuitry for processing successive samples to detect for (a) the average value of the difference between quantised high and low levels of the transducer output signal and (b) periodic variation of the amplitude of the transducer output signal as represented by the successive samples.

6. The light level sensor as claimed in claim 1 wherein a relay device is connected in circuit with the means for generating the sensor output signal, the relay device being arranged to be connected in circuit with artificial lighting and being arranged to be activated by the sensor output signal.

7. The light level sensor as claimed in claim 6 wherein the means for generating the sensor output signal functions to generate a relay ON signal if the level of the transducer output signal is below the predetermined level or the level of the transducer output signal is above the predetermined level and cyclic variations occur in the level of the transducer output signal, and wherein the means for generating the sensor output signal functions to generate a relay OFF signal if the level of the transducer output signal is above the predetermined level and cyclic variation is not detected in the transducer output signal.

8. The light level sensor as claimed in claim 7 wherein means are provided for storing the relay ON and OFF signals over a further predetermined period and wherein means are provided to detect if the total number of ON signals is greater than the total number of OFF signals by a predetermined factor over the further predetermined period, wherein means are provided for generating a relay energising signal if the relay ON signals predominate over the relay OFF signal by the predetermined factor, and wherein a relay de-energising signal is generated if the relay OFF signals predominate by the predetermined factor over the relay ON signals during the further predetermined period.

* * * * *